(12) United States Patent
Ishii

(10) Patent No.: US 11,373,571 B2
(45) Date of Patent: Jun. 28, 2022

(54) METHOD FOR CONTROLLING IMAGE AND IMAGE DISPLAY DEVICE

(71) Applicant: NEC Display Solutions, Ltd., Tokyo (JP)

(72) Inventor: Eisaku Ishii, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 16/761,455

(22) PCT Filed: Nov. 10, 2017

(86) PCT No.: PCT/JP2017/040587
§ 371 (c)(1),
(2) Date: May 4, 2020

(87) PCT Pub. No.: WO2019/092848
PCT Pub. Date: May 16, 2019

(65) Prior Publication Data
US 2021/0174719 A1  Jun. 10, 2021

(51) Int. Cl.
*G09G 3/20* (2006.01)
*G06F 1/3234* (2019.01)

(52) U.S. Cl.
CPC .............. *G09G 3/20* (2013.01); *G06F 1/3265* (2013.01); *G09G 2330/023* (2013.01); *G09G 2370/02* (2013.01); *G09G 2370/22* (2013.01)

(58) Field of Classification Search
CPC .......... G06F 1/3265; G09G 3/20; G09G 5/00; G09G 2330/023; G09G 2370/02; G09G 2370/22; H04N 21/431; H04N 21/442
See application file for complete search history.

(56) References Cited

U.S. PATENT DOCUMENTS

2001/0024967 A1* 9/2001 Bauer ................ H04W 52/027
                                                          455/574
2007/0086425 A1  4/2007 Leow et al.
(Continued)

FOREIGN PATENT DOCUMENTS

CN    1831632 A    9/2006
CN  101668188 A    3/2010
(Continued)

OTHER PUBLICATIONS

International Search Report (ISR) (PCT Form PCT/ISA/210), in PCT/JP2017/040587, dated Feb. 6, 2018.
(Continued)

*Primary Examiner* — Abbas I Abdulselam
(74) *Attorney, Agent, or Firm* — McGinn IP Law Group, PLLC

(57) ABSTRACT

The present invention has a communication portion configured to establish an image transmission system for receiving an image signal from an image transmitting device via a network; and a connection information management portion configured to set the total number of the image transmission systems established for each of a plurality of the image transmitting devices as the number of connections, wherein the connection information management portion does not change the number of connections even if the image transmission system is disconnected, when the image transmitting device shifting into a power saving mode causes the image transmission system to be disconnected.

16 Claims, 6 Drawing Sheets

(56) References Cited

U.S. PATENT DOCUMENTS

| | | |
|---|---|---|
| 2007/0279679 A1 | 12/2007 | Tanimoto |
| 2010/0050006 A1* | 2/2010 | Nishibayashi ........ G06F 1/3228 |
| | | 713/320 |
| 2016/0019860 A1* | 1/2016 | Maeda ............... H04N 21/4424 |
| | | 345/520 |

FOREIGN PATENT DOCUMENTS

| | | |
|---|---|---|
| CN | 102693106 A | 9/2012 |
| CN | 103079285 A | 5/2013 |
| CN | 11041255361 A | 10/2014 |
| JP | 2002-320221 A | 10/2002 |
| JP | 2008-083182 A | 4/2008 |
| JP | 2011-097490 A | 5/2011 |
| JP | 2012-032934 A | 2/2012 |
| JP | 2012-093769 A | 5/2012 |
| JP | 2012-147146 A | 8/2012 |
| JP | 2013-164658 A | 8/2013 |
| JP | 2015-014903 A | 1/2015 |
| JP | 2016-024220 A | 2/2016 |
| KR | 10-2011-0062829 A | 6/2011 |

OTHER PUBLICATIONS

Chinese Office Action, dated Jan. 17, 2022, in Chinese Application No. 201780096486.5 and English Translation thereof.

\* cited by examiner

FIG. 4

| CONNECTION NUMBER | CONNECTION IDENTIFIER | DISPLAY AREA (STATE) | CONNECTION STATUS |
|---|---|---|---|
| #1 | Z001 | NONE | CONNECTED |
| #2 | Z002 | C (VIDEO DISPLAYED) | CONNECTED |
| #3 | Z003 | NONE | CONNECTED |
| #4 | Z004 | B (VIDEO MUTED) | DISCONNECTED (POWER SAVING MODE) |
| #5 | Z005 | NONE | CONNECTED |
| #6 | Z006 | A (VIDEO MUTED) | DISCONNECTED (POWER SAVING MODE) |
| #7 | Z007 | NONE | CONNECTED |
| #8 | Z008 | NONE | DISCONNECTED (POWER SAVING MODE) |
| #9 | Z009 | D (VIDEO DISPLAYED) | CONNECTED |
| #10 | Z010 | NONE | DISCONNECTED (POWER SAVING MODE) |

METHOD FOR CONTROLLING IMAGE AND IMAGE DISPLAY DEVICE

TECHNICAL FIELD

The present invention relates to a method for displaying an image and an image display device for displaying an image in a display, a projector or the like.

BACKGROUND ART

Conventionally, there has been a method in which a plurality of image transmitting devices and an image display device are connected at a ratio of N:1 via a network, and when transmitting video, the video is transmitted as continuous still images (for example, refer to Patent Document 1). There has also been a method in which an image display device displays video from connected image transmitting devices by dividing the display area (for example, see Patent Document 2).

When image data is simultaneously received from a plurality of image transmitting devices by the above-described method, and the display area of the image display device is divided to display the video from each image transmitting device, it is necessary to disable the power saving mode (so-called energy saving mode) of each image transmitting device to always maintain the network connection (the image transmission system between each image transmitting device and the image display device) in order to always maintain the state of being able to transmit images in the divided display area even when there is no need to display an image in the display area.

CITATION LIST

Patent Literature

[Patent Document 1] Japanese Unexamined Patent Application, First Publication No. 2012-147146
[Patent Document 2] Japanese Unexamined Patent Application, First Publication No. 2016-024220

SUMMARY OF INVENTION

Problem to be Solved by the Invention

However, at the same time, when each of the plurality of image transmitting devices and the image display device are connected via a network, there also exists a case where it is not necessary to perform image transmission from the image transmitting devices depending on the state of the screen division area. However, even in this case, since the power saving mode of the image transmitting device is disabled, there is a problem of the battery of the image transmitting device being wastefully consumed.

As a conventional method, there is also an image transmission method that, without disabling the power saving mode of an image transmitting device, disconnects the network between the image transmitting device and the image display device (disconnects the image transmission system) if the image transmitting device is not operated after the passage of a predetermined time. However, when the display area of the image display device has been released from the image transmitting device, the problem arises of the display state of the image display device being changed because an image to be displayed is not transmitted.

Moreover, while one image transmitting device already connected to the image display device is in the power saving mode, another image transmitting device may be connected. In this case, the maximum number of image transmitting devices that can be connected to the image display device is exceeded. Even if the one image transmitting device returns from the power saving mode, since the maximum number of image transmitting devices that can be connected is already exceeded, there is also the problem that connection to the image display device is not possible.

In view of the above-described problems, it is an object of the present invention to provide an image display system and an image display method in which, when using a plurality of image transmitting devices and an image display device connected at a ratio of N:1 via a network, the battery of each image transmitting device is not wastefully consumed when there is no need to perform image transmission to the image display device, the display state of the image display device is not changed even if the network is disconnected between the image transmitting device and the image display device, and no connection is made by another image transmitting device while one image transmitting device is in the power saving mode.

Means for Solving the Problem

According to a first aspect of the present invention, an image display device includes a communication portion configured to establish an image transmission system for receiving an image signal from an image transmitting device via a network; and a connection information management portion configured to set the total number of the image transmission systems established for each of a plurality of the image transmitting devices as the number of connections, wherein the connection information management portion does not change the number of connections even if the image transmission system is disconnected, when the image transmitting device shifting into a power saving mode causes the image transmission system to be disconnected.

According to a second aspect of the present invention, a method for managing connection information includes establishing an image transmission system for receiving an image signal from an image transmitting device via a network; and setting the total number of the image transmission systems established for each of a plurality of the image transmitting devices as the number of connections, and not changing the number of connections even if the image transmission system is disconnected when the image transmitting device shifting into a power saving mode causes the image transmission system to be disconnected.

Advantageous Effects of Invention

According to the present invention, when transmitting an image between a plurality of image transmitting devices and an image display device via a network, when the state of no user operation has continued, it is possible to shift the image transmitting device into a power saving mode, and the image display device can perform control as if the image transmitting device is connected.

According to the present invention, during the period from after an image transmitting device shifting into a power saving mode until returning from the power saving mode, it is possible to prevent another image transmitting device different from that image transmitting device stealing the display area allocated to the image transmitting device that has shifted into the power saving mode by connecting to the image display device.

Moreover, according to the present invention, with the above-described configuration, it is possible to shift an image transmitting device in which the state of no user operation has continued into the power saving mode, and so possible to inhibit consumption of the battery of an image transmitting device that does not need to transmit an image.

BRIEF DESCRIPTION OF THE DRAWINGS

FIG. 4 is a diagram illustrating a configuration example of a connection information management table stored in a connection information management data storage portion 131 when 10 image transmitting devices are connected to the image display device 1.

DESCRIPTION OF EMBODIMENTS

An image transmitting device according to the present invention maintains the connection state to the image display device while keeping a power saving mode enabled. On the other hand, the image display device, upon being notified by the image transmitting device of a request to temporarily disconnect the image transmission system established in the network due to a shift into the power saving mode, behaves as if the image transmission system with the image transmitting device has not been disconnected. That is, an image indicating a video mute state is displayed in the display area assigned to the image transmitting device whose image transmission system has been temporarily disconnected, and operation is continued without reducing the number of currently connected image transmitting devices. Thereafter, by the return from the power saving mode of the image transmitting device whose image transmission system had been temporarily disconnected, this image transmitting device is again connected to the image display device, thereby displaying in the display area assigned to the image transmitting device whose image transmission system was temporarily disconnected the image from this image display device that returned from temporary disconnection of the image transmission system. By the image transmitting device and the image display device operating in this way, even if one image transmitting device repeats the operations of shifting into the power saving mode and returning from the power saving mode, a mechanism is possessed of operating without affecting other image transmitting devices.

Figure 1:
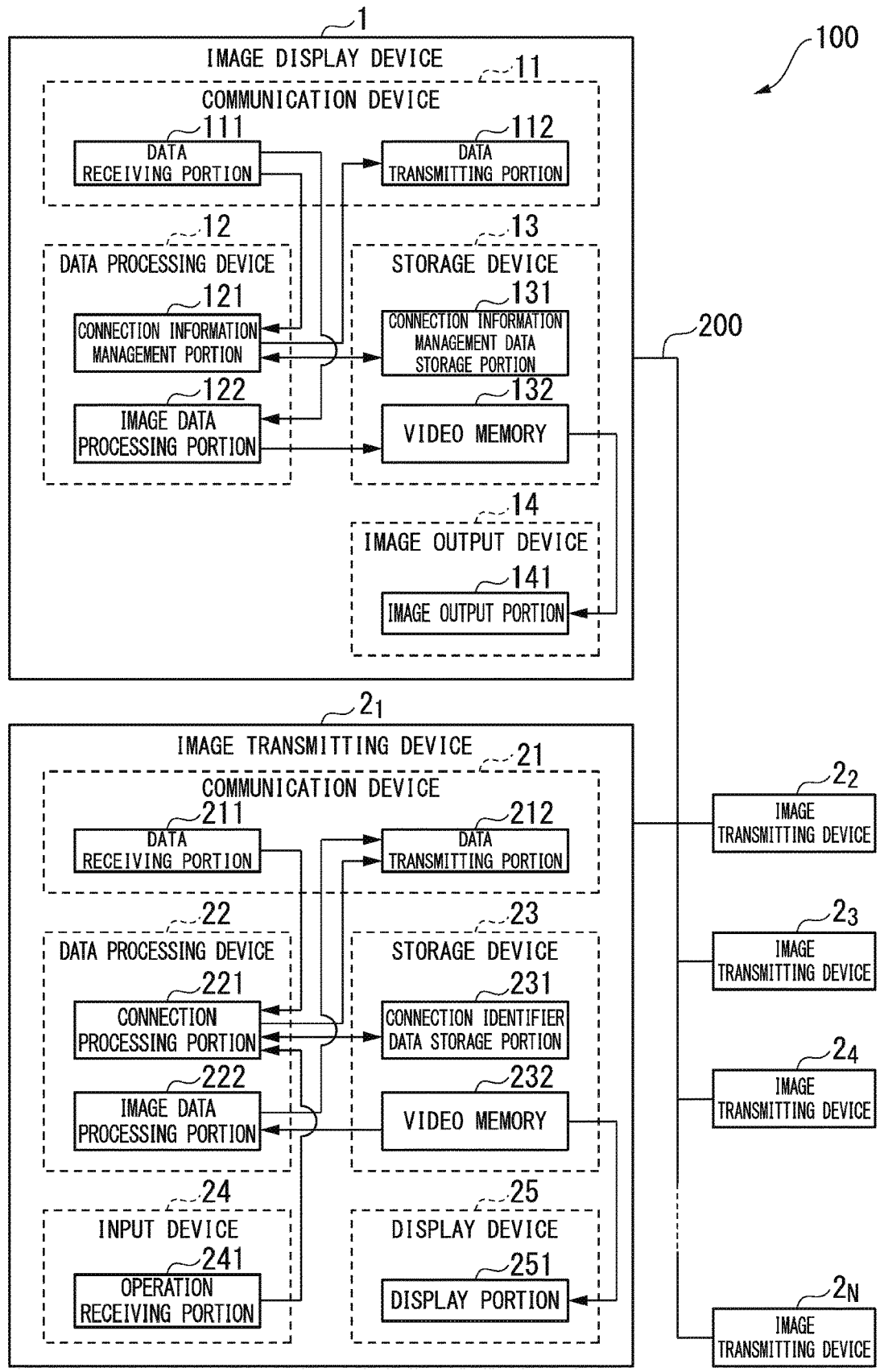
FIG. 1 is a diagram showing a configuration example of an image display system 100 using an image display device 1 according to an embodiment of the present invention.

Hereinbelow, an image display system using an image display device according to the embodiment of the present invention will be described with reference to the drawings. FIG. 1 is a diagram illustrating a configuration example of an image display system 100 using an image display device 1 according to the embodiment of the present invention.

As shown in FIG. 1, the image display device 1 is connected to a plurality of image transmitting devices, for example, image transmitting devices $2_1$ to $2_N$, via a network 200. Hereinbelow, each of the image transmitting devices $2_1$ to $2_N$ will be simply referred to as the image transmitting device 2 when collectively describing the functions and operations thereof or when describing without specifying any particular one.

The image display device 1 is provided with a communication device 11, a data processing device 12, a storage device 13, and an image output device 14. The communication device 11 is provided with a data receiving portion 111 and a data transmitting portion 112. The data processing device 12 is provided with a connection information management portion 121 and an image data processing portion 122. The storage device 13 is provided with a connection information management data storage portion 131 and a video memory 132. The image output device 14 is provided with an image output portion 141.

The image transmitting device 2 (each of the image transmitting devices $2_1$ to $2_N$) is provided with a communication device 21, a data processing device 22, a storage device 23, an input device 24, and a display device 25. Further, the communication device 21 is provided with a data receiving portion 211 and a data transmitting portion 212. The data processing device 22 is provided with a connection processing portion 221 and an image data processing portion 222. The storage device 23 is provided with a connection identifier data storage portion 231 and a video memory 232. The input device 24 is provided with an operation receiving portion 241. The display device 25 is provided with a display portion 251.

Figure 2:
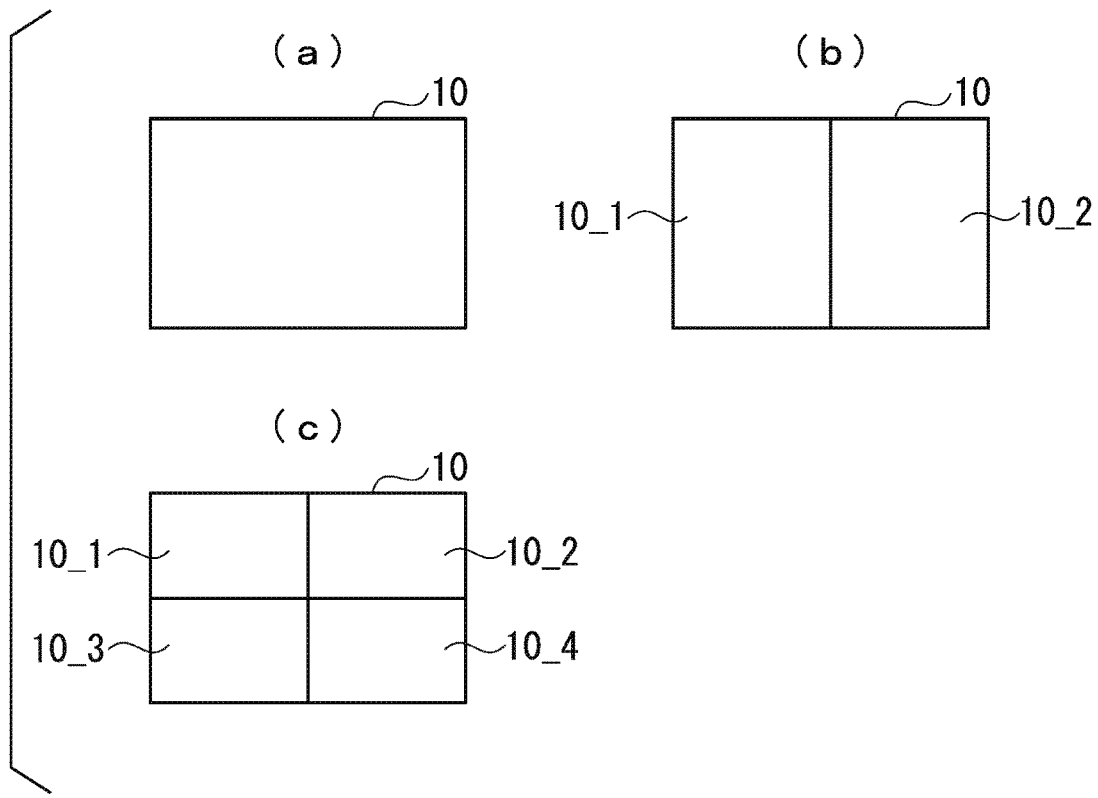
FIG. 2 is a diagram illustrating a configuration example in which a display screen of an image display device is divided into a plurality of display areas corresponding to a plurality of image transmitting devices.

FIG. 2 is a diagram showing a configuration example in which the display screen of the image display device is divided into a plurality of display areas corresponding to the plurality of image transmitting devices.

In FIG. 2(a), the display screen 10 of the image display device 1 is not divided into a plurality, and has a display area corresponding to one image transmitting device $2_1$. In FIG. 2(b), the display screen 10 of the image display device 1 is divided into a plurality, that is, each of the display regions 10_1 and 10_2. At this time, for example, an image from the image transmitting device $2_1$ is displayed in the display area 10_1, and an image from the image transmitting device $2_2$ is displayed in the display area 10_2.

In FIG. 2(c), the display screen 10 of the image display device 1 is divided into a plurality, that is, four display areas 10_1, 10_2, 10_3, and 10_4. At this time, for example, an image from the image display device $2_1$ is displayed in the display region 10_1, an image from the image transmitting device $2_2$ is displayed in the display region 10_2, an image from the image display device $2_3$ is displayed in the display region 10_3, and an image from the image transmitting device $2_4$ is displayed in the display area 10_4.

In the above description, the number of divisions of the display screen of the image display device 1 and the number of the image transmitting devices 2 connected to the image display device 1 have been described as being the same.

However, it is not necessary that the number of divisions of the display screen of the image display device 1 and the number of the image transmitting devices 2 connected to the image display device 1 match. That is, the display area on the display screen can be divided into arbitrary sizes and numbers regardless of the number of the image transmitting devices 2 connected to the image display device 1. When the number of connected image transmitting devices 2 is larger than the number of screen divisions, it means that there are image transmitting devices 2 for which display areas of the image display device have not been allocated. When the display area of the image display device 1 is assigned to each of the image transmitting devices 2, an image transmission system is established between the image display device 1 and each image transmitting device 2 via a network and enters a connected state. The connection information management portion 121 manages the total number of image transmission systems as the number of connections.

Figure 3:
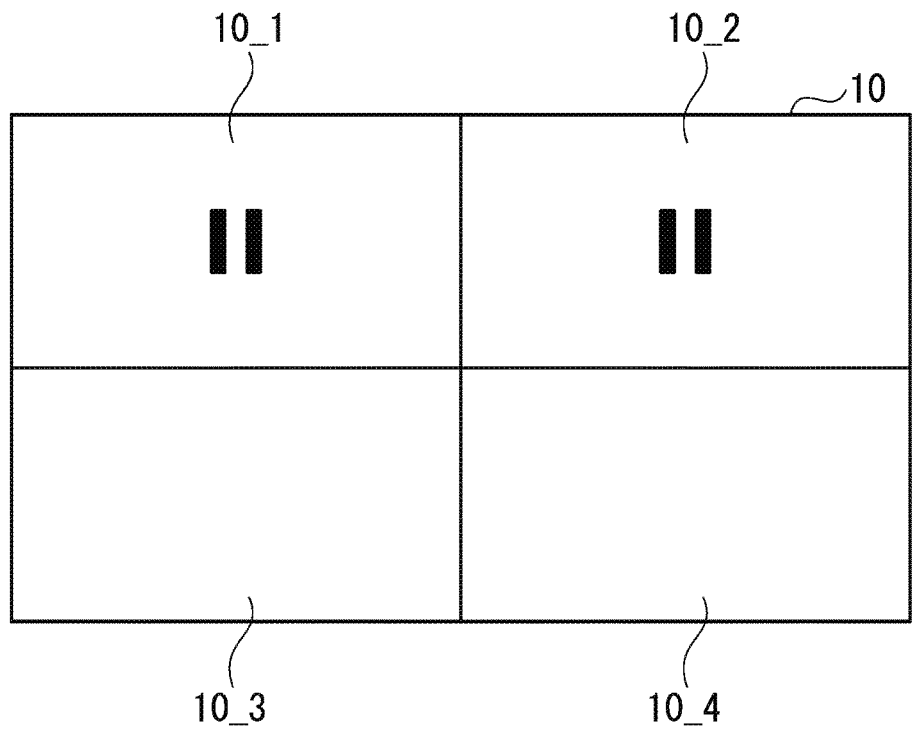
FIG. 3 is a diagram showing a state in which, out of four display areas obtained by dividing the display screen of the image display device 1 into four, two display areas are muted.

FIG. 3 is a diagram showing a state in which two display areas of the four display areas obtained by dividing the display screen of the image display device 1 into four are video-muted. In FIG. 3, the display screen 10 of the display device 1 is divided into display areas 10_1, 10_2, 10_3, and 10_4, and the display area 10_1 and the display area 10_2 of these display areas are video-muted.

FIG. 4 is a diagram illustrating a configuration example of a connection information management table stored in the connection information management data storage portion 131 when 10 image transmitting devices are connected to the image display device 1. For example, each of the image transmitting devices $2_1$ to $2_{10}$ is connected to the image display device 1. In the connection information management table shown in FIG. 4 are provided columns respectively for a connection number, a connection identifier, a display area (state), and a connection status for each record. The connection number is a number indicating the order in which each of the image transmitting devices 2 is connected in the image display device 1. Each of the image transmitting devices $2_1$ to $2_{10}$ is connected to the image display device 1 in correspondence with one of the connection numbers #1, . . . , #10. The connection identifier is identification information that is given to each image transmitting device connected in accordance with the connection number and identifies each of the image transmitting devices.

The display area (state) indicates the state of the assignment to each of the display areas on the display screen of the image display device for each of the image transmitting devices 2 connected in accordance with the connection numbers. For example, the connection number #1 indicates the image transmitting device $2_5$, the connection number #2 indicates the image transmitting device $2_3$, the connection number #3 indicates the image transmitting device $2_6$, the connection number #4 indicates the image transmitting device $2_2$, the connection number #5 indicates the image transmitting device $2_7$, the connection number #6 indicates the image transmitting device $2_1$, the connection number #7 indicates the image transmitting device $2_8$, the connection number #8 indicates the image transmitting device $2_9$, the connection number #9 indicates the image transmitting device $2_4$, and connection number #10 indicates the image transmitting device $2_{10}$.

Here, when made to correspond to the display screen of FIG. 3, display regions 2_1, 2_2, 2_3, and 2_4 are respectively assigned from the image transmitting device 21 to image transmitting device 24, respectively. On the other hand, a display area on the display screen of the image display device 1 is not allocated to each of the image transmitting devices 25 to 210. In the column for display area (state), "None" is shown when the display area is not allocated, and the code of the display area (each of 2_1 to 2_4) is shown when the display area is allocated.

In the column for display area (state), when a display area is allocated, one of "video being displayed" and "video muted" is displayed as the display state. "Video being displayed" indicates a state in which an image is supplied from the image transmitting device 2 and displayed in the display area as the normal state, with the image transmitting device 2 not being in the power saving mode. On the other hand, "video muted" means that the image transmitting device 2 is in the power saving mode, and indicates a state in which an image indicating video muting is displayed in the display area without an image being supplied from the image transmitting device 2, as a disconnected state in which the image transmission system is disconnected.

That is, as shown in FIG. 3, each of the image transmitting devices 21 and 22 is in the power saving mode, the image transmission systems thereof enter the disconnected state, and an image indicating video muting is displayed in each of the display areas 10_1 and 10_2. On the other hand, images (video) from the image transmitting devices 23 and 24 that are not in the power saving mode are supplied and displayed in the display areas 10_3 and 10_4, respectively.

The connection status is a status indicating a state of whether the respective connection between the image display device and the image transmitting device corresponding to the connection number is connected, or whether the image transmission system is disconnected (disconnection due to the power saving mode). "Connected" is shown in the column for the image transmitting device 2 in which a connection to the image display device 1 is continued, while "disconnected (power saving mode)" is shown in the column for the image transmitting device 2 in which a connection to the image display device 1 has entered the power saving mode, whereby the image transmission system is temporarily disconnected.

For example, in FIG. 4, the connection status of the image transmitting devices 2 with the connection numbers #1~#3, #5, #7 and #9 is "connected", due to the connection to the image display device 1 being continued. In addition, the connection status of the image transmitting devices 2 with the connection numbers #4, #6, #8 and #10 is "disconnected", due to the connection to the image display device 1 being switched to the power saving mode, whereby the image transmission system is temporarily disconnected.

As described above, by using the connection information management table in the connection information management data storage portion 131, the image display device 1 manages the connection information indicating the connected state of the image transmission system between itself and the image transmitting device 2. Thereby, even if only six image transmitting devices 2 (connection numbers #1~#3, #5, #7 and #9) are actually connected, it is possible to perform control of the image transmitting devices 2 as if 10 image transmitting devices 2 (connection numbers #1~#10) are connected. That is, when the image transmission system enters the non-connected state due to the image transmitting device 2 shifting into the power saving mode, the number of connections managed by the connection information management portion 121 is not changed.

In the present embodiment, "connected" indicates a state in which the image transmitting device 2 is connected to the image display device 1. This "connected state" indicates a state in which an image transmission system is established as a path through which image data can be transferred in a network. When TCP (Transmission Control Protocol) is used, the "connected state" indicates a state in which a logical communication path (connection) is set, that is, a state in which a connection is established. In a state where a connection is established, generally packets are transferred periodically for the purpose of checking the state of the connection even if image data is not transferred. Even if the image display device 1 and each of the image transmitting devices 2 are in the "connected state", a display area is not necessarily allocated to each of the image transmitting devices 2 in the image display device 1. If a display area is not allocated, even if the image transmitting device 2 has transferred image data, no image based on that image data is displayed on the image display device 1.

In the present embodiment, "disconnected" indicates a state in which the image transmission system of the image transmitting device 2 with respect to the image display device 1 has been disconnected. The "disconnected state" of the image transmission system indicates a state in which a path through which image data can be transferred has not been established. When TCP is used, the "disconnected state" indicates a state in which an image transmission system such as a port used for data transfer has been released, that is, a state in which a connection (transmission system) has been released. In a state where the connection is released, regular transfer of a packet for the purpose of confirming the state of the connection or the like is generally not performed.

When the image transmission system between the image display device 1 and the image transmitting device 2n is in the "disconnected state", the image display device 1 does not receive image data from the image transmitting device 2n via the network. However, in the present embodiment, even in the "disconnected state", when the image transmitting device 2 is "disconnected (power saving mode)", the number of connections is not decremented (described later) in the image display device 1. In addition, in the case of "disconnected" (power saving mode), a display area of the image transmitting device 2 may be allocated in the image display device 1 even in the "disconnected state" as described above. That is, in the case of "disconnected (power saving mode)", since the connection information management portion 121 does not change the number of connections being managed, the assigned display area remains assigned without being released for the image transmitting device 2 that is now "disconnected (power saving mode)". For this reason, when there is a reconnection request from the image transmitting device 2 in the "disconnected (power saving mode)", and reconnection of the image transmission system is performed, the connection information management portion 121 does not change the number of connections.

Figure 5:
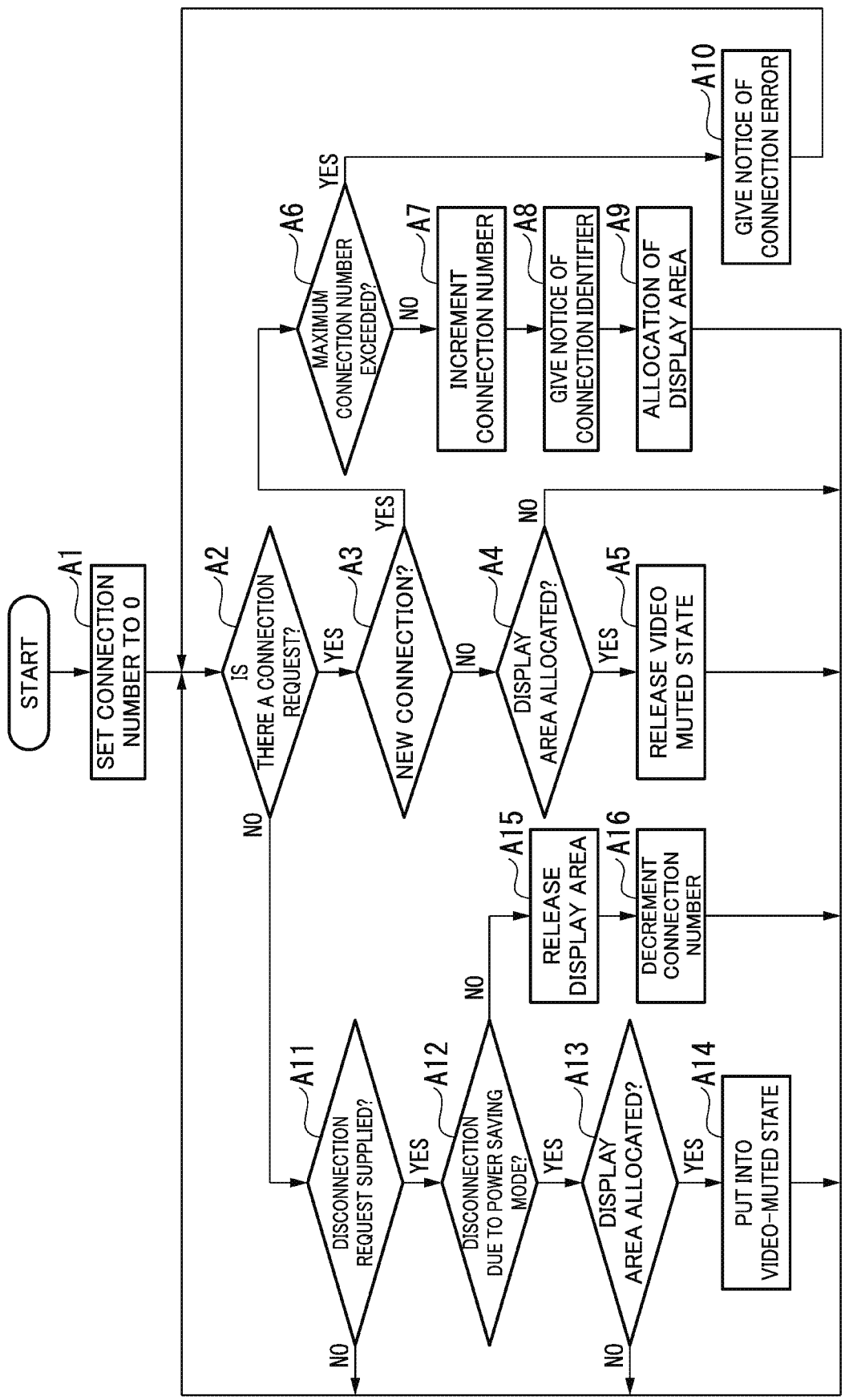
FIG. 5 is a flowchart showing an operation example showing control of the connection between the image display device 1 and the image transmitting device 2 according to the embodiment of the present invention.

FIG. 5 is a flowchart illustrating an operation example showing control of the connection between the image display device 1 and the image transmitting device 2 according to the embodiment of the present invention.

Step A1: The connection information management portion 121 sets (resets) the connection number counter provided therein to "0" as an initial value.

Step A2: The connection information management portion 121 detects whether a connection request has been made from any of the image transmitting devices 2 in the network 200 via the data receiving portion 111. At this time, if the connection information management portion 121 detects a connection request from any of the image transmitting devices 2, the process proceeds to Step A3. On the other hand, if the connection information management portion 121 does not detect a connection request from the image transmitting device 2, the process proceeds to Step A2.

Step A3: The connection information management portion 121 determines whether the connection request is for a new connection or a reconnection based on whether or not a connection identifier is added to a request signal indicating a connection request from the image transmitting device 2 that made the connection request. That is, here, in the case of a new connection, a connection identifier is not added to a request signal indicating the connection request, while in the case of reconnection, a connection identifier that has already been assigned is added to the request signal indicating the connection request.

At this time, if the connection identifier is added to a request signal indicating a connection request from the image transmitting device 2, the connection information management portion 121 determines that the connection is a reconnection (determines that the connection is not a new connection (N)), and the process proceeds to Step A4. On the other hand, if the connection identifier is not added to a request signal indicating a connection request from the image transmitting device 2, the connection information management portion 121 determines that the connection is a new connection (makes a determination of Y), and the process proceeds to Step A6.

Step A4: The connection information management portion 121 refers to the connection information management table in the connection information management data storage portion 131, searches for the answered connection identifier, and determines whether a display area is allocated. That is, the connection information management portion 121 performs a search to determine whether "None" or the number of the display area is indicated in the display area (state) column corresponding to the connection identifier in the connection information management table.

At this time, if "None" is indicated in the display area (state) column corresponding to the connection identifier, the connection information management portion 121 determines that a display area has not been assigned to the image transmitting device 2 corresponding to this connection identifier, and since there is no need to receive image data from the image transmitting device 2, advances the process to Step A2. On the other hand, when the "display area number" is indicated in the display area (state) column corresponding to the connection identifier, the connection information management portion 121 determines that a display area has been assigned to the image transmitting device 2 corresponding to the connection identifier, and so in order to receive the image data from the image transmitting device 2 and display the image data in a display device not illustrated, advances the process to Step A5.

Step A5: The connection information management portion 121 changes the connection status of the image transmitting device 2 corresponding to the connection identifier from "disconnected (power saving mode)" to "connected" in the connection information management table in the connection information management data storage portion 131, and changes the display area (state) to the display area number (video displayed). The connection information management portion 121 requests the image transmitting device 2 to transmit image data.

The image data processing portion 122 receives the image data from the image transmitting device 2 via the data receiving portion 111, performs image processing such as γ correction on the image data to correspond to the characteristics of the display device, and writes the image data following the image processing to the video memory 132.

Then, the image output portion 141 displays the image data written in the video memory 132 on the display area of the number corresponding to the connection identifier on the display screen of the display device.

Step A6: If the image transmitting device 2 requesting connection is a new connection, the connection information management portion 121 refers to an internal connection number counter and determines whether the number of image transmitting devices 2 currently under management (the count number of the connection number counter) is a preset maximum connection number. That is, the connection information management portion 121 determines whether or not newly connecting the image transmitting device 2 that is requesting connection would lead to the maximum number of connections being exceeded.

At this time, if newly connecting the image transmitting device 2 that is requesting connection would lead to the maximum connection number being exceeded (Y), since the connection information management portion 121 cannot perform connection of the new image transmitting device 2, the process proceeds to Step A10. On the other hand, if the maximum connection number is not exceeded (N) even if the image transmitting device 2 that is requesting connection is newly connected, the connection information management portion 121 proceeds to Step A7 in order to perform connection of the new image transmitting device 2.

Step A7: The connection information management portion 121 assigns a connection identifier to the image transmitting device 2 that has requested connection. Then, the connection information management portion 121 writes the connection identifier of the image transmitting device 2 into the connection information management table in the connection information management data storage portion 131. The connection information management portion 121 increments the count of the connection number counter (adds "1").

Step A8: The connection information management portion 121 transmits the connection identifier assigned in Step A7 to the image transmitting device 2 requesting the connection, and transmits that the connection has been normally performed.

Step A9: The connection information management portion 121 allocates a display area on the display screen of the display device to the newly connected image transmitting device 2. The connection information management portion 121 writes and stores the "display area number" assigned to the image transmitting device 2 in the display area (state) column, and "connected" in the connection status column of the connection information management table in the connection information management data storage portion 131.

Thereby, the image data processing portion 122 requests the newly connected image transmitting device 2 to transmit image data.

The image data processing portion 122 receives the image data from the image transmitting device 2 via the data receiving portion 111, performs image processing such as γ correction on the image data to correspond to the characteristics of the display device, and writes the image data following the image processing to the video memory 132. Then, the image output portion 141 displays the image data written in the video memory 132 in a display area of the number corresponding to the connection identifier on the display screen of the display device.

Step A10: Due to the maximum number of connections being exceeded by newly connecting the image transmitting device 2 requesting connection, the connection information management portion 121 transmits an error signal indicating that connection of the new image transmitting device 2 cannot be performed to the image transmitting device 2 requesting connection.

Step A11: The connection information management portion 121 detects whether a request for disconnection of the image transmission system has been supplied from any of the currently connected image transmitting devices 2. At this time, when a request for disconnection of the image transmission system has been supplied from the image transmitting devices 2, the connection information management portion 121 advances the process to Step A12 to perform the disconnection processing of the image transmission system. On the other hand, when a request for disconnection of the image transmission system has not been supplied from the image transmitting devices 2, the connection information management portion 121 advances the process to Step A2.

Step A12: The connection information management portion 121 determines whether or not the image transmission system disconnection request from the image transmitting device 2 is a disconnection request due to the image transmitting device 2 having shifted into the power saving mode. At this time, if the image transmission system disconnection request from the image transmitting device 2 is due to the image transmitting device 2 having shifted into the power saving mode (Y), the connection information management portion 121 advances the process to Step A13. On the other hand, if the image transmission system disconnection request from the image transmitting device 2 is not due to the image transmitting device 2 having shifted into the power saving mode but rather a general image transmission system disconnection request (N), the connection information management portion 121 advances the process to Step A15.

Step A13: In the case of the image transmission system disconnection request from the image transmitting device 2 being due to having shifted into the power saving mode, the connection information management portion 121 refers to the connection information management table in the connection information management data storage portion 131 and determines whether or not a display area of the display device has been assigned on the basis of the connection identifier of the image transmitting device 2 that made the disconnection request. At this time, if a display area of the display device has been allocated to the image transmitting device 2 that requested disconnection, the connection information management portion 121 advances the process to Step A14. On the other hand, when a display area of the display device is not allocated to the image transmitting device 2 that has requested disconnection, the connection information management portion 121 rewrites the connection status to "disconnected (power saving mode)", and advances the process to Step A2.

Step A14: The image data processing portion 122 writes a video-muted image to an address in the video memory 132 corresponding to the display area allocated to the image transmitting device 2 that has requested the disconnection. As a result, the image output portion 141 displays the video-muted image in the display area allocated to the image transmitting device 2 (for example, see FIG. 3). Then, the connection information management portion 121 rewrites the connection status of the image transmitting device 2 corresponding to the connection identifier from "connected" to "disconnected (power saving mode)", and rewrites the display area (state) to the display area number (video muted) in the connection information management table in the connection information management data storage portion 131.

Step A15: The connection information management portion 121 deletes, from the connection information management table in the connection information management data storage portion 131, the information (record) of the image transmitting device 2 that has requested disconnection of the image transmission system. Thereby, the connection information management portion 121 releases the display area allocated to the image transmitting device 2 that has requested the disconnection of the image transmission system.

Step A16: The connection information management portion 121 decrements the count of the connection number counter (subtracts "1"), and advances the processing to Step A2.

Figure 6:
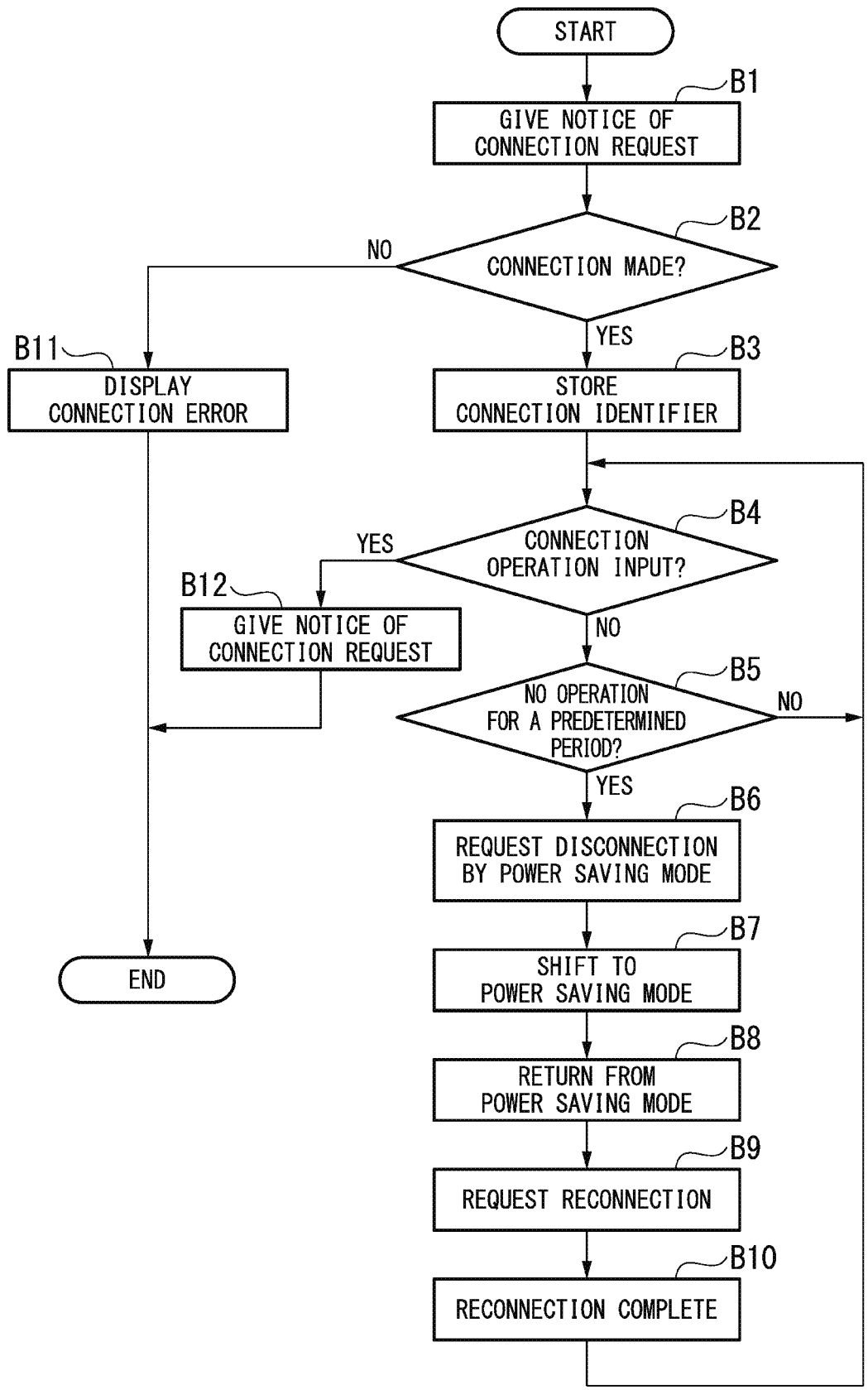
FIG. 6 is a flowchart illustrating an operation example showing control of transmission of image data by the image transmitting device 2 to the image display device 1 according to the embodiment of the present invention.

FIG. 6 is a flowchart showing an operation example showing control of the transmission of image data by the image transmitting device 2 to the image display device 1 according to the embodiment of the present invention.

Step B1: The connection processing portion 221 transmits a connection request to the image display device 1 via the data transmitting portion 212.

Step B2: The connection processing portion 221 confirms whether or not a connection identifier has been received from the image display device 1 in response to the connection request. When the connection identifier has been supplied, the connection processing portion 221 at this time determines that a connection corresponding to the connection request has been made in the image display device 1 (Y), and advances the processing to Step B3.

Step B3: The connection processing portion 221 writes and stores the connection identifier supplied from the image display device 1 in the connection identifier data storage portion 231.

The image data processing portion 222 reads the image data stored in the video memory 232, and outputs the read image data to the image display device 1 via the data transmitting portion 212.

The image data processing portion 222, after performing image processing such as γ correction on the read image data, outputs the read image data to the display device 25. The display device 25 thereby displays the image data supplied from the image data processing portion 222 on the display screen of the display portion 251.

The connection processing portion 221 sets (resets) an internal timer to "0" and starts counting.

Through the above-described processing, the connection processing portion 221 completes the connection processing of the image transmitting device 2 to the image display device 1.

Step B4: The connection processing portion 221 detects whether or not a disconnection operation for disconnecting the image transmission system with the image display device 1 has been input from the operation receiving portion 241. At this time, when a disconnection operation for disconnecting the image transmission system with the image display device 1 has been input from the operation receiving portion 241 (Y), the connection processing portion 221 advances the process to Step B12. On the other hand, when a disconnection operation for disconnecting the image transmission system with the image display device 1 has not been input from the operation reception portion 241 (N), the connection processing portion 221 advances the process to Step B5.

Step B5: The connection processing portion 221 reads the time measured by the timer, and determines whether the read time has passed a predetermined time. At this time, when the time measured by the timer has passed a predetermined time (Y), the connection processing portion 221 advances the process to Step B6. On the other hand, when the time measured by the timer has not passed the predetermined time (N), the connection processing portion 221 advances the process to Step B4.

Step B6: Since no operation has been input for a certain period of time, the connection processing portion 221 needs to shift into the power saving mode. Since the connection processing portion 221 thereby becomes unable to transmit image data to the image display device 1, the connection processing portion 221 transmits a disconnection request, to the image display device 1, indicating disconnection of the image transmission system due to the necessity of shifting into the power saving mode. The connection processing portion 221 may configure the transmission to the image display device 1 by dividing the "request for disconnection of the image transmission system due to shift into power saving mode (predetermined disconnection request)" into a "notification of shift into power saving mode (predetermined notification)" and a "disconnection request notification".

Step B7: Then, after transmitting the request for disconnection of the image transmission system due to the shift into the power saving mode, the image display device 2 shifts into the power saving mode.

Step B8: When an operation is supplied to the image transmitting device 2 via the operation receiving portion 241, the image transmitting device 2 shifts (returns) from the power saving mode into the normal operation mode.

Step B9: After returning from the power saving mode, the connection processing portion 221 transmits to the image display device 1 a request to reconnect the image transmitting device 2 to the image display device 1 (a request signal indicating a connection request already described). At this time, the connection processing portion 221 reads the connection identifier added to itself from the connection identifier data storage portion 231, adds the connection identifier to the request for reconnection, and transmits the request to the image display device 1.

Step B10: Upon receiving a signal supplying the transmission of image data from the image display device 1, the connection processing portion 221 detects that the image transmitting device has been normally reconnected to the image display device 1. Thereby, the image data processing portion 222 reads out the image data stored in the video memory 232 and outputs the read image data to the image display device 1 via the data transmitting portion 212.

Step B11: When a connection error signal indicating that connection of a new image transmitting device 2 cannot be performed is supplied in response to the connection request transmitted to the image display device 1, the connection processing portion 221 outputs information indicating this connection error to the display device 25. Thereby, the display device 25 displays a connection error on the display screen of the display portion 251 indicating that connection with the image display device 1 could not be performed, and gives notice that connection with the image display device 1 has failed.

Step B12: The connection processing portion 221 transmits to the image display device 1 a request for disconnection of the image transmission system due to a disconnection operation being input from the operation receiving portion 241, and not for disconnection of the image transmission system due to the power saving mode. Then, the image data processing portion 222 stops the process of outputting image data of the video memory 232 to the image display device 1.

With the above-described configuration, according to the present embodiment, if the state of no user operation continues while image data is being transmitted between the plurality of image transmitting devices 2 and the image display device 1 via the network 200, it is possible to perform disconnection of the image transmission system from the image display device 1 by shifting the image transmitting device 1 into the power saving mode, and since an image indicating video muting is displayed on the display screen of the image display device 2, the image transmitting device 1 can be controlled as if connected.

Further, according to the present embodiment, even after the image transmitting device 2 has shifted into the power saving mode, since management of the image transmitting device 2 in the connection information management data table is continued based on the connection identifier that has been given, it is possible to prevent another image transmitting device 2 different from this image transmitting device 2 from stealing the display area allocated to the image transmitting device 1 that has shifted into the power saving mode by connecting to the image display device 1 until the image transmitting device 2 returns from the power saving mode.

Further, according to the present embodiment, by inhibiting theft of the display area by the other image transmitting device 2, it is possible to shift into the power saving mode the image transmitting device 2 in which a state has continued of there being no operation from the user while under the control of the image display device 1, and so it is possible to suppress the consumption of the battery of the image transmitting device 2 which does not need to transmit an image.

Figure 7:
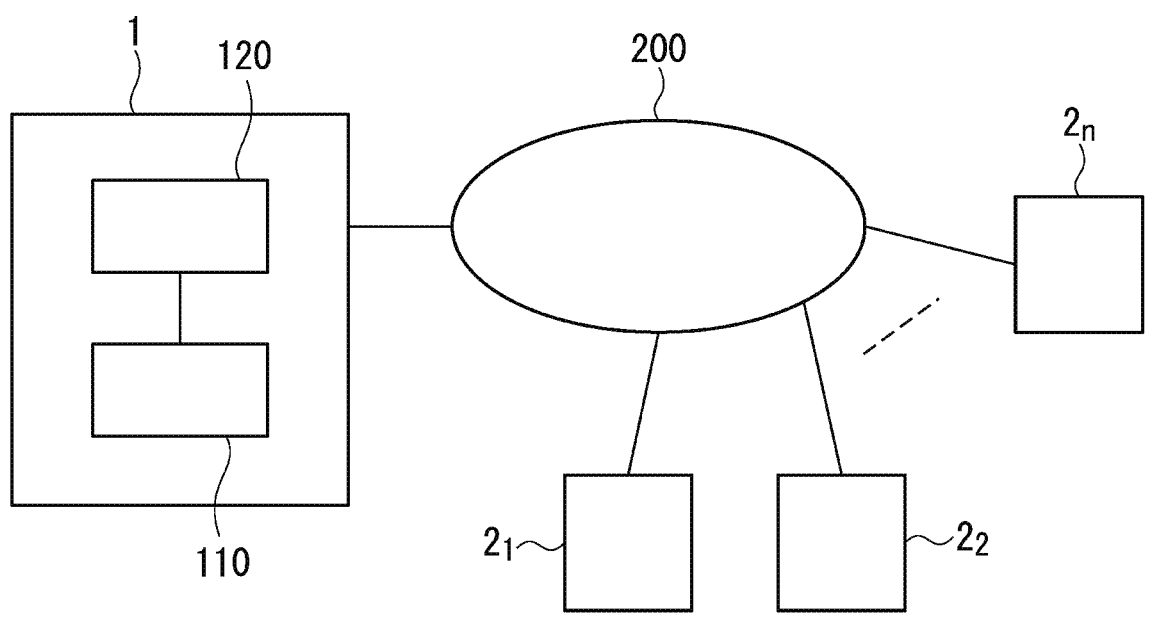
FIG. 7 is a diagram for explaining the concept of the embodiment of the present invention.

FIG. 7 is a diagram illustrating the concept of the embodiment of the present invention. In FIG. 7, the image display device 1 according to the embodiment of the present invention is connected to a plurality of image transmitting devices 2, that is, each of the image transmitting devices $2_1$ to $2_n$, via a communication portion 120. The image display device 1 simultaneously displays image data transmitted from each of the image transmitting device $2_1$ to image transmitting device $2_n$ in display areas obtained by dividing a display screen (not shown) of the display device. Each of the display areas of the display screen is respectively allocated to each image transmitting device 2, whereby the image data from the corresponding image transmitting devices 2 are displayed at the same time.

When there is no operation input for a certain period of time, the image transmitting device 2 shifts into the power saving mode, and once disconnects the connection (image transmission system) between the image transmitting device 1 and the communication portion 120.

Then, when the image transmission system from the image transmitting device 2 that has shifted into the power saving mode to the image display device 1 has been disconnected, the connection information management portion 110 puts the image transmitting device 2 that has shifted into the power saving mode in a state of the connection thereof being continued without changing the number of connections of the image transmitting devices 2 connected to the image display device 1. In addition, the connection information management portion 110 causes an image indicating video muting to be displayed in the (corresponding) display area allocated to the image transmitting device 2 whose image transmission system has been disconnected and that has shifted into the power saving mode, the image causing the image transmitting device 2 whose image transmission system has been disconnected and that has shifted into the power saving mode to be visually recognized as being connected.

As a result, when the image transmitting device 2 has shifted into the power saving mode, and the image transmission system with the image display device 1 is once disconnected, it is controlled as if the image transmitting device 2 that has shifted into the power saving mode is continuously connected. Therefore, it is possible to prevent another image transmitting device 2 different from this image transmitting device 2 from stealing the display area allocated to the image transmitting device 1 that has shifted into the power saving mode by connecting an image transmission system to the image display device 1 until the image transmitting device 2 returns from the power saving mode.

Further, when displaying image data transmitted from a plurality of the image transmitting devices in the image display device of FIG. 1 by assigning to display areas obtained by dividing the display screen of the image display device into a plurality, a process that displays an image indicating video muting in the display area allocated to the image transmitting device that has shifted into the power saving mode and that causes the connection with the image transmitting device to be virtually performed, and control for realizing a control function in the image display device, may be performed by an external computer system. Here, the "computer system" includes an operating system and hardware such as peripheral devices.

Although the embodiments of the present invention have been described in detail with reference to the drawings, the specific configuration is not limited to the embodiments, and includes designs and the like not departing from the gist of the present invention.

INDUSTRIAL APPLICABILITY

The image display method and the image display device described above, in a method of connecting a plurality of image transmitting devices and an image display device projector by establishing an image transmission system via a network and of transmitting video, are effective in realizing an appropriate divided display while the image transmission shifts into a power saving mode in an image transmission method capable of operating with consideration for the environment.

REFERENCE SIGNS LIST

1: Image display device
2, $2_1$, $2_2$, $2_n$: Image transmitting device
11, 21: Communication device
12, 11: Data processing device
13, 23: Storage device
14: Image output device
24: Input device
25: Display device
111, 211: Data receiving portion
112, 212: Data transmitting portion
131: Connection information management data storage portion
132, 232: Video memory
200: Network
231: Connection identifier data storage portion
241: Operation receiving portion
251: Display portion

The invention claimed is:

1. An image display device comprising:
   a communication portion configured to establish an image transmission system for receiving an image signal from an image transmitting device via a network; and
   a connection information management portion configured to set the total number of the image transmission systems established for each of a plurality of the image transmitting devices as the number of connections,
   wherein the connection information management portion is configured to release the image transmission system when a first disconnection request for releasing the image transmission system is received from the image transmitting device, and
   wherein the connection information management portion is configured not to change the number of connections even if the image transmission system is disconnected due to the image transmitting device shifting into the power saving mode when a second disconnection request due to a shift into the power saving mode is received from the image transmitting device.

2. The image display device according to claim 1, wherein the connection information management portion, upon receiving a predetermined disconnection request or a predetermined notification from the image transmitting device, does not change the number of connections even if the image transmission system is disconnected.

3. The image display device according to claim 1, wherein the connection information management portion, when a first image transmission system that is the image transmission system for receiving an image signal from a first image transmitting device among the plurality of image transmitting devices is re-established after being disconnected by the first image transmitting device shifting into the power saving mode, does not change the number of connections even if the first image transmission system is re-established.

4. The image display device according to claim 1, wherein the connection information management portion, when a predetermined identifier is included in a request signal from a first image transmitting device among the plurality of image transmitting devices after a first image transmission system that is the image transmission system for receiving an image signal from the first image transmitting device is disconnected, does not change the number of connections even if the first image transmission system is re-established.

5. The image display device according to claim 1, further comprising an image data processing portion configured to cause, when a first display area is allocated to a first image transmitting device among the plurality of image transmitting devices, and when a first image transmission system that is the image transmission system for receiving an image signal from the first image transmitting device is disconnected by the first image transmitting device shifting into a power saving mode, an image indicating video muting to be displayed in the first display area.

6. The image display device according to claim 5, wherein the image data processing portion displays an image of an image signal received from the first image transmitting device instead of the image indicating video muting in the first display area when the first image transmitting device returns from the power saving mode and the first image transmission system is re-established.

7. The image display device according to claim 5, wherein the first display area being released, when the first display area is allocated to the first image transmitting device and the first image transmission system is disconnected without the first image transmitting device shifting into a power saving mode.

8. The image display device according to claim 1, wherein the connection information management portion is configured to determine whether or not an image transmission system disconnection request from the image transmitting device is a disconnection request due to the image transmitting device having shifted into the power saving mode.

9. The image display device according to claim 1, wherein the number of connections is the total number of a first image transmitting device and a second image transmitting device, the first image transmitting device is in a state of video being displayed, and the second image transmitting device is in a state of video muted.

10. An image display system comprising:
    one or a plurality of image transmitting devices configured to transmit image signals; and
    an image display device configured to receive the image signals via a network,
    wherein the image display device comprising:
    a communication portion configured to establish an image transmission system for receiving the image signal from the one or plurality of image transmitting devices; and
    a connection information management portion configured to set the total number of the image transmission systems established for the one or each of the plurality of the image transmitting devices as the number of connections,
    wherein the connection information management portion is configured to release the image transmission system when that a first disconnection request for releasing the image transmission system is received from the image transmitting device, and
    wherein the connection information management portion is configured not to change the number of connections even if the image transmission system is disconnected due to the image transmitting device shifting into the power saving mode when a second disconnection request due to a shift into the power saving mode is received from the image transmitting device.

11. The image display system according to claim 10, wherein the connection information management portion is configured to determine whether or not an image transmission system disconnection request from the image transmitting device is a disconnection request due to the image transmitting device having shifted into the power saving mode.

12. The image display system according to claim 10, wherein the number of connections is the total number of first image transmitting device and second image transmitting device, the first image transmitting device is in a state of video being displayed, and the second image transmitting device is in a state of video muted.

13. A connection processing method comprising:
    receiving an operation;
    establishing an image transmission system for transmitting an image signal to an image display device via a network;
    transmitting a first disconnection request to the image display device when the operation is an operation for disconnecting the image transmission system, and transmitting a second disconnection request to the image display device when shifting into a power saving mode; and releasing the image transmission system when that the first disconnection request for releasing the image transmission system is received, and wherein the number of connections are not changed even if the image transmission system is disconnected due to shifting into the power saving mode when the second disconnection request due to the shift into the power saving mode is received.

14. The connection processing method according to claim 13, wherein the second disconnection request includes a notification of shifting into the power saving mode.

15. The connection processing method according to claim 13, further comprising:

determining whether or not an image transmission system disconnection request is a disconnection request due to having shifted into the power saving mode, and wherein the total number of the image transmission systems is established for each of a plurality of image transmitting devices as the number of connections.

16. The connection processing method according to claim 13, wherein the number of connections is a total number of first image transmitting devices and second image transmitting devices, and wherein the first image transmitting device is in a state of video being displayed, and the second image transmitting device is in a state of video muted.

* * * * *